US007848956B1

(12) United States Patent
MacLean

(10) Patent No.: US 7,848,956 B1
(45) Date of Patent: Dec. 7, 2010

(54) CREATIVE MEDIA MARKETPLACE SYSTEM AND METHOD

(75) Inventor: Bradley W. MacLean, Holland, MI (US)

(73) Assignee: Creative Byline, LLC, Holland, MI (US)

( * ) Notice: Subject to any disclaimer, the term of this patent is extended or adjusted under 35 U.S.C. 154(b) by 1256 days.

(21) Appl. No.: 11/308,501

(22) Filed: Mar. 30, 2006

(51) Int. Cl.
*G06Q 30/00* (2006.01)
(52) U.S. Cl. ........................................... 705/26
(58) Field of Classification Search .................. 705/26, 705/27
See application file for complete search history.

(56) References Cited

U.S. PATENT DOCUMENTS

| | | | |
|---|---|---|---|
| 5,164,897 | A | 11/1992 | Clark et al. |
| 5,740,425 | A | 4/1998 | Povilus |
| 6,092,081 | A | 7/2000 | Alpert et al. |
| 6,282,549 | B1 | 8/2001 | Hoffert et al. |
| 6,401,097 | B1 | 6/2002 | McCotter et al. |
| 6,643,663 | B1 | 11/2003 | Dabney et al. |
| 6,654,767 | B2 | 11/2003 | McAnaney et al. |
| 6,704,733 | B2 | 3/2004 | Clark et al. |
| 6,842,761 | B2 | 1/2005 | Diamond et al. |
| 6,850,900 | B1 | 2/2005 | Hare et al. |
| 6,865,568 | B2 | 3/2005 | Chau |
| 6,868,394 | B1 * | 3/2005 | Mele ............................ 705/26 |
| 6,904,410 | B1 | 6/2005 | Weiss et al. |
| 6,915,276 | B2 | 7/2005 | Foster et al. |
| 6,925,469 | B2 | 8/2005 | Headings et al. |
| 6,938,005 | B2 | 8/2005 | Iverson et al. |
| 6,957,041 | B2 | 10/2005 | Christensen et al. |
| 6,976,028 | B2 | 12/2005 | Fenton et al. |
| 6,979,028 | B2 | 12/2005 | Muroi et al. |
| 6,990,498 | B2 | 1/2006 | Fenton et al. |
| 7,013,307 | B2 | 3/2006 | Bays et al. |
| 7,099,847 | B2 | 8/2006 | Darling |

(Continued)

OTHER PUBLICATIONS

Greene, Amanda, "The Rise of the Online Art Gallery; More and More, Art Retailers and Individual Artists are Pushing Their Products Online. Clearly, The Internet Approach is in the Future for Art Sales. But is the Physical Gallery on Its Way Out?" Star-News, Wilmington, NC, Feb. 2, 3006, p. 14.*

*Primary Examiner*—Amee A Shah
(74) *Attorney, Agent, or Firm*—Van Dyke, Gardner, Linn & Burkhart, LLP

(57) ABSTRACT

A creative marketplace system and a computer-based method for marketing creative media include providing a computer system, the computer system defining a database. Inputs are received with said computer system from a plurality of potential sellers of media content and a plurality of potential purchasers of media content. Wherein, the inputs received from a potential seller include at least a portion of media content and media content data. The media content data includes a characteristic of media content and/or a characteristic of the potential seller of that media content. Wherein, the receiving inputs from a potential purchaser include receiving a selection of media content desired. The media content desired is selected from a characteristic of media content and/or a characteristic of the potential seller of that media content. Media content data is submitted that corresponds with media content desired by at least one potential buyer. The media content and media content data may be required to be submitted to a quality review process prior to submitting to at least one potential buyer.

18 Claims, 18 Drawing Sheets

U.S. PATENT DOCUMENTS

| | | |
|---|---|---|
| 7,099,885 B2 | 8/2006 | Hellman et al. |
| 7,127,670 B2 | 10/2006 | Bendik |
| 7,136,863 B2 | 11/2006 | Wang |
| 7,136,866 B2 | 11/2006 | Springer, Jr. et al. |
| 7,143,111 B2 | 11/2006 | Yamada |
| 7,178,097 B1 | 2/2007 | Talluri |
| 7,181,468 B2 | 2/2007 | Spring et al. |
| 7,188,074 B2 | 3/2007 | Younger |
| 7,212,985 B2 | 5/2007 | Sciuk |
| 7,246,106 B2 | 7/2007 | Gaynor et al. |
| 7,257,767 B1 | 8/2007 | Carden, Jr. |
| 7,263,655 B1 | 8/2007 | Carden, Jr. |
| 7,266,767 B2 | 9/2007 | Parker |
| 7,275,044 B2 | 9/2007 | Chauvin et al. |
| 7,275,067 B2 | 9/2007 | Rising, III |
| 7,275,083 B1 | 9/2007 | Seibel et al. |
| 2001/0032189 A1 | 10/2001 | Powell |
| 2001/0056396 A1 | 12/2001 | Goino |
| 2002/0116365 A1 | 8/2002 | Kusin |
| 2002/0128935 A1* | 9/2002 | White et al. .................. 705/27 |
| 2003/0028469 A1 | 2/2003 | Bergman et al. |
| 2003/0208435 A1* | 11/2003 | Posner ........................ 705/37 |
| 2004/0006543 A1 | 1/2004 | Twining et al. |
| 2004/0250203 A1 | 12/2004 | Yamada |
| 2005/0028087 A1 | 2/2005 | Barrie et al. |
| 2006/0149616 A1 | 7/2006 | Hildick-Smith |
| 2007/0033208 A1 | 2/2007 | Talluri |
| 2007/0050194 A1 | 3/2007 | Maxey |
| 2007/0073596 A1 | 3/2007 | Alexander et al. |
| 2007/0083510 A1 | 4/2007 | McArdle |
| 2007/0083934 A1* | 4/2007 | McArdle ..................... 726/26 |
| 2007/0129956 A1 | 6/2007 | Stinski |
| 2007/0130040 A1 | 6/2007 | Stinski |
| 2007/0179940 A1 | 8/2007 | Robinson et al. |
| 2009/0024457 A1* | 1/2009 | Foroutan .................... 705/12 |
| 2009/0037259 A1* | 2/2009 | Blenk ......................... 705/10 |

* cited by examiner

JOHN S. HUGHLEY                                    HELP  LOG OUT

SUBMISSIONS  EDITORS  COMMUNITY  RESOURCES  NEWSLETTER  MY ACCOUNT

CREATE NEW QUERY PACKAGE
MANUSCRIPT DETAILS                                        36
                         STEP 1 OF 3

A QUERY PACKAGE CONTAINS ELEMENTS THAT AN EDITOR OR PUBLISHER WILL NEED TO GET A GLIMPSE OF YOUR MANUSCRIPTS. FOR TIPS ON CREATING AN EFFECTIVE QUERY PACKAGE, CLICK HERE. ( COPY ABOUT PRICE GOES HERE )

ALL FIELDS ARE REQUIRED       —100
                                                    —102
*TYPE:  [CHOOSE A CATEGORY ♦] [SELECT SUB GENRES ▼]
*TITLE:                        ☐ GENERAL/OTHER      ☐ NON-ENGLISH FICTION
*SYNOPSIS:                     ☑ ACTION & ADVENTURE ☐ POETRY
                               ☐ EROTICA            ☐ POLITICAL
  104                          ☐ FANTASY            ☐ ROMANCE
                               ☐ GAY/LESBIAN        ☐ SCIENCE FICTION
  106                          ☐ HISTORICAL FICTION ☐ SHORT STORIES ( SINGLE AUTHOR )
                               ☐ HORROR                & ANTHOLOGIES (MULTIPLE AUTHORS)
                               ☐ HUMOROUS           ☐ SPORTS
*OUTLINE:                      ☐ LITERARY           ☐ THRILLERS/SUSPENSE
*FIRST 3 CHAPTERS:             ☑ MYSTERY/DETECTIVE/CRIME ☑ WAR & MILITARY/ESPIONAGE
                                                    ☐ WESTERNS
      108—  PREVIEW  SUBMIT FOR INITIAL REVIEW

HOME TOUR COMMUNITY RESOURCES NEWS LETTER

FIG. 5

JOHN S. HAUGHEY                                      [HELP] [LOG OUT]

SUBMISSIONS   EDITORS   COMMUNITY   RESOURCES   NEWSLETTER   MY ACCOUNT
                              54
                                                                    ─116
FIND AN EDITOR                              MY EDITORS
LOCATE EDITORS THAT WILL MOST LIKELY BE INTERESTED IN YOUR WORK.
                                            BOB KALAN      DOUBLEDAY         NOTES (x)
BY NAME                          ─110       BEN BONDS      DOUBLEDAY         NOTES (x)
                                            CHRIS CARTER   CHRONICLE BOOK    NOTES (x)
      EDITOR NAME: [            ]           LARRY JAMES    PENGUIN           NOTES (x)
                                      ─112  JANET KRATZ    ROCKPORT          NOTES (x)
      PUBLISHER NAME: [         ] SEARCH    LILLIAN LANG   SIMON & SCHUS     NOTES (x)
            -OR- BROWSE ALL PUBLISHERS      HEATHER NG     SIMON & SCHUS     NOTES (x)
                                            BRUCE WATSON   SIMON & SCHUS     NOTES (x)
                                            ALI ALITO      DUTTON CHILDRE    NOTES (x)
BY GENRE                   ─114             BEN BONDS      DOUBLEDAY         NOTES (x)
     LOOKING FOR: [FICTION    ▽] [SELECT SUB-GENRES ▽]  VIEW ALL
     SUB-GENRES: ACTION AND ADVENTURE (x) ☐ GENERAL/OTHER       ☐ NON ENGLISH FICTION
                 LITERARY (x)             ☑ ACTION & ADVENTURE  ☐ POETRY
                 RELIGOUS (x)             ☐ EROTICA             ☐ POLITICAL
                 SEARCH                   ☐ FANTASY             ☐ ROMANCE
                                          ☐ GAY/LESBIAN         ☐ SCIENCE FICTION
EDITORS THAT MATCH MY QUERY PACKAGE        ☐ HISTORICAL FICTION  ☐ SHORT STORIES (SINGLE AUTHOR)
                                          ☐ HORROR                  & ANTHOLOGIES ( MULTIPLE AUTHORS)
     WHICH PACKAGE? [QUERY PACKAGE 1  ▽]  ☐ HUMOROUS            ☐ SPORTS
                                          ☐ LITERARY            ☐ THRILLERS/SUSPENSE
                                          ☑ MYSTERY/DETECTIVE/CRIME ☑ WAR & MILLITARY/ESPIONAGE
                                                                ☐ WESTERNS
                                                         ─116

HOME TOUR COMMUNITY RESOURCES NEWSLETTER

JOHN S. HUGHLEY                                    [HELP | LOG OUT]

SUBMISSIONS   EDITORS   COMMUNITY   RESOURCES   NEWSLETTER   MY ACCOUNT

MY EDITORS                READY TO CREATE A NEW MANUSCRIPT PACKAGE?   <u>CREATE NEW MANUSCRIPT PACKAGE</u>

« PREVIOUS 1 2 NEXT »                                    <u>116</u>
SELECT ALL  DESELECT ALL

130 ☐ EDITORS NAME   ☐ TITLE   ☐ PUBLISHER   ☐ GENRES ACCEPTED   ☐ MY NOTES
☑ JOE MURPHY        EDITOR    SIMON & SCHUSTER  FICTION ACTION AND ADVENTURE  CURRENTLY LOOKING FOR...(EDIT)

EDITOR'S NOTES: VEL EUM IRIURE DOLOR IN HENDRERIT IN VULPUTATE VELIT ESSE MOLESTIE CONSEQUAT,
VEL ILLUM DOLORE EU FEUGIAT NULLA FACILISIS AT VERO EROS ET ACCUMSAN ET IUSTO ODIO DIGNISSIM QUI
BLANDIT PRAESENT LUPTATUM ZZRIL DELENIT AUGUE.

VIEW EDITOR PROFILE

☐⊞ ROGER MARTIN      EDITOR           CHRONICLE BOOKS   ALL SUB-GENRES NON-FICTION      NOT LOOKING FOR ANY...(EDIT)
☐⊞ DANIEL WOODWARD  JUNIOR EDITOR    SIMON & SCHUSTER   FICTION: SELF-HELP, RELIGION    ACCEPTING NEW NON-FICT...(EDIT)
☐⊞ JOE MURPHY        EDITOR IN CHIEF  PENGIUN           FICTION: ACTION AND ADVENTURE           (ADD NOTE)
☐⊞ BOB KALAN         EDITOR           CHRONICLE         FICTION:ADVICE, ACTION AND ADVENTURE    (ADD NOTE)
☐⊞ BETH ROMANOSKI    EDITOR           SIMON & SCHUSTER  FICTION: ADVICE, RELIGION       REJECTED ONCE FROM THIS...(EDIT)
☐⊞ TOM CALLAHAN      SENIOR EDITOR    SIMON & SCHUSTER  FICTION: ACTION AND ADVENTURE           (ADD NOTE)
☐⊞ ROGER MARTIN      EDITOR           DOUBLEDAY         ALL SUB-GENRES NON-FICTION              (ADD NOTE)
☐⊞ DANIEL WOODWARD  EDITOR IN CHIEF  SIMON & SCHUSTER   FICTION: SELF-HELP, RELIGION            (ADD NOTE)
☐⊞ JOE MURPHY        EDITOR           PENGIUN           FICTION: ACTION AND ADVENTURE   EXELLENT SOURCE FOR...(EDIT)
☐⊞ BOB KALAN         JUNIOR EDITOR    CHRONICLE         FICTION:ADVICE, ACTION AND ADVENTURE  AWARDED PUBLISHER OF...(EDIT)
☐⊞ BETH ROMANOSKI    SCOUT            SIMON & SCHUSTER  FICTION: ADVICE, RELIGION           (ADD NOTE)
☐⊞ TOM CALLAHAN      EDITOR           SIMON & SCHUSTER  FICTION: ACTION AND ADVENTURE           (ADD NOTE)
☐⊞ ROGER MARTIN      EDITOR           PENGIUN           ALL SUB-GENRES NON-FICTION              (ADD NOTE)
☐⊞ DANIEL WOODWARD  EDITOR IN CHIEF  CHRONICLE BOOKS    FICTION: SELF-HELP, RELIGION    PUBLISHED ALEX'S BOOK...(EDIT)
☐⊞ JOE CAMPBELL      EDITOR           DOUBLEDAY         FICTION: ACTION AND ADVENTURE   AWARDED PUBLISHER OF(EDIT)
☐⊞ MARCY DARCY       EDITOR           TASCHEN           FICTION:ADVICE, ACTION AND ADVENTURE  NOT LOOKING FOR ANY...(EDIT)

<u>REMOVE SELECTED</u>

« PREVIOUS 1 2 NEXT »

HOME  TOUR  COMMUNITY  RESOURCES  NEWSLETTER

*FIG. 9*

JOHN S. HAUGHEY                     | HELP | LOG OUT |

     
SUBMISSIONS   EDITORS   COMMUNITY   RESOURCES   NEWSLETTER   MY ACCOUNT

EDIT PROFILE                                                                 38

PLEASE UPDATE YOUR INFORMATION AND CLICK THE "SAVE PROFILE" BUTTON AT THE BOTTOM OF THE PAGE. FIELDS MARKED WITH AN ASTERISK (*) ARE REQUIRED.

NAME AND ADDRESS

\* FIRST NAME [JOHN]  ~140
MIDDLE INITIAL [ ]
\* LAST NAME [HAUGHEY]
\* STREET ADDRESS [2 MILK STREET]
APT/SUITE/UNIT [APT. 4]
\* CITY [NEWBURYPORT]
\* STATE [MA]
\* ZIP / POSTAL CODE [01950]
\* E-MAIL ADRESS [JHUGHLEY@GMAIL.COM]
URL [http://]

MANAGE YOUR ACCOUNT
EDIT PROFILE
EDIT CREDIT CARD INFORMATION
EDIT SUBSCRIPTION PREFERENCES

BIOGRAPHY (MAXIMUM 500 CHARACTERS)              142

LOREM IPSUM DOLOR SIT AMET, CONSECTETUER ADIPISCING ELIT, SED DIAM NONUMMY NIBH EUISMOD TINCIDUNT UT LAOREET DOLORE MAGNA ALIQUAM ERAT VOLUTPAT. UT WISI ENIM AD MINIM VENIAM, QUIS NOSTRUD EXERCI TATION ULLAMCORPER SUSCIPIT LOBORTIS NISL UT ALIQUIP EX EA COMMODO CONSEQUAT. DUIS AUTEM VEL EUM IRIURE DOLOR IN HENDRERIT IN VULPUTATE VELIT ESSE MOLESTIE CONSEQUAT, VEL ILLUM DOLORE EU FEUGIAT NULLA FACILISIS AT VERO EROS ET ACCUMSAN ET IUSTO ODIO DIGNISSM.

AWARDS  ——144
☐ CHECK HERE IF YOU HAVE WON ANY PROFFESIONAL WRITING AWARDS.
LIST AWARD(S) WON        YEAR

ORGANIZATIONS ——146
INDICATE YOUR MEMBERSHIP IN SPECIFIC WRITING ORGANIZATIONS
☐ AG-AUTHOR'S GUILD
☐ ASJA-THE AMERICAN SOCIETY OF JOURNALISTS AND AUTHORS
☐ AWP-ASSOCIATION OF WRITERS & WRITING PROGRAMS
☐ NWU - NATIONAL WRITERS UNION
☐ ROMANCE WRITERS OF AMERICA
☐ SCBWI- SOCIETY OF CHILDREN'S BOOK WRITERS AND ILLUSTRATORS
☐ SFWA- SCIENCE FICTION & FANTASY WRITERS OF AMERICA
☐ WGA- WRITERS GUILD OF AMERICA

BOB VILA                                            HELP | LOG OUT

MY MANUSCRIPTS    SEARCH MANUSCRIPTS    MY PREFERENCES    COMPANY ADMIN

WANT TO CHANGE YOUR TARGETED PREFERENCES? UPDATE PREFERENCES

MY MANUSCRIPTS

TARGETED /172  GENERAL /174  HISTORY

| TITLE | AUTHOR | GENRE /170 /176 | VIEWED /178 | REPLIED /180 | EXPIRATION DATE /182 | |
|---|---|---|---|---|---|---|
| MARCH 5 - MARCH 11 | | | | | | |
| SWEET OCTOBER | ARTHUR T. GRANT ✿ | NON-FICTION, ACTION, AD | ✓ | ✓ | 10/12/06 | CONTACT THE AUTHOR |
| DEUX EX | ALEXANDER DOUGLAS ✿ ♛ | NON-FICTION | ✓ | ✓ | 10/11/06 | CONTACT THE AUTHOR |
| ANNO DOMINUS | E.M. STEVENS | NON-FICTION | ✓ | ✓ | 10/10/06 | CONTACT THE AUTHOR |
| FEBRUARY 26-MARCH 4 | | | | | | |
| ONE MORE | MARIE DESALLE | NON-FICTION | ✓ | ✓ | 09/12/06 | CONTACT THE AUTHOR |
| ELIZABETH DOWN | HARVEY WILLIS ✿ ♛ | NON-FICTION | ✓ | ✓ | 09/11/06 | CONTACT THE AUTHOR |
| CIRCUS CIRCUS | R. KALAMBULA | NON-FICTION | ✓ | ✓ | 09/10/06 | CONTACT THE AUTHOR |
| FEBRUARY 19-FEBRUARY 25 | | | | | | |
| A TRILLION LITTLE | JAMES FRANKLIN ✿ | NON-FICTION | ✓ | ✓ | 08/12/06 | CONTACT THE AUTHOR |
| I THINK I CAN | NATHANIEL CARNEGIE ✿ ♛ | NON-FICTION | ✓ | ✓ | 08/11/06 | CONTACT THE AUTHOR |
| MAN OF WAR | LAUREN ASIA LEE ✿ ♛ | NON-FICTION | ✓ | ✓ | 08/10/06 | CONTACT THE AUTHOR |

✿ = PUBLISHED    ♛ = AWARDED                                78

HOT NEW MANUSCRIPTS

MOST RECENT MANUSCRIPTS IN THE GENERAL MANUSCRIPT CATEGORY.
◉ VIEW MY GENRES ONLY
○ VIEW MOST RECENT (ALL GENRES) VIEW

| TITLE | AUTHOR |
|---|---|
| SPAGHETTI EDDIE | ARTHUR T. GRANT |
| TOSS | ALEXANDER DOUGLAS |
| NEVER AGAIN | E.M. STEVENS |
| MY PARIS | MARIE DESALLE |
| NOT WITHOUT MY | HARVEY WILLIS |

VIEW MORE

SEARCH MANUSCRIPTS

FIND WHAT YOU'RE LOOKING FOR, USE OUR CONVENIENT SEARCH TOOL TO VIEW ALL SUBMISSIONS ON CREATIVE BYLINE. FIND YOUR DIAMOND IN THE ROUGH.

SEARCH

MANAGE MY PREFERENCES

- SPECIFY HOW OFTEN YOU WANT TO RECEIVE NEW MANUSCRIPTS, WEEKLY, BI-WEEKLY, OR MONTHLY.
- FILTER MANUSCRIPTS FROM PUBLISHED OR AWARDED AUTHORS ONLY.
- UPDATE YOUR EDITOR INFORMATION, VACATION MESSAGES AND MORE!

EDIT MY PREFERENCES

HOME  TOUR  COMMUNITY  RESOURCES  NEWSLETTER

FIG. 12

JOHN S. HUGHLEY    HELP ?    LOG OUT

MY MANUSCRIPTS    SEARCH MANUSCRIPTS    MY PREFERENCES    COMPANY ADMIN

MY PREFERENCES

MANUSCRIPT PREFERENCES                                      MANAGE YOUR PREFERENCES
                                                              EDIT PROFILE
            GENRE AND FREQUENCY — 184                         EDIT MANUSCRIPT PREFERENCES
GENRES ACCEPTED: [GENRE ▼] [SELECT SUB-GENRES ▼] — 185        EDIT STANDARD RESPONSES
    SUB-GENRES:   ADVICE AND RELATIONSHIPS (X)                CHANGE PASSWORD
I WANT TO RECEIVE [WEEKLY ▼] ?
    MANUSCRIPTS:                — 186

AUTHOR CRITERIA — 188                                        80
ACCEPT: ☐ PUBLISHED AUTHORS ONLY
        ☐ AWARD-WINNING AUTHORS ONLY
        ☐ MEMBERS OF THE FOLLOWING ASSOCIATIONS   (SELECT ORGANIZATIONS ▽)
               AUTHOR'S ASSOCIATION OF AMERICA (X)
               AMERICAN AUTHOR'S COALITION (X)
               NORTH AMERICA WRITERS GUILD (X)
               ARTIST'S RIGHT SOCIETY OF NEW YORK (X)
        ☐ REFERRED AUTHORS ONLY

VACATION MESSAGE
YOUR STATUS: ○ ACTIVE (YES, ACCEPT TARGETED MANUSCRIPTS)
             ○ OUT OF THE OFFICE (NO, NOT ACCEPTING MANUSCRIPTS)
VACATION MESSAGE: [                    ]

SAVE CHANGES
        CANCEL

*FIG. 13a*

JOHN S. HUGHLEY                                      | HELP | LOG OUT |

MY MANUSCRIPTS    SEARCH MANUSCRIPTS    MY PREFERENCES    COMPANY ADMIN

SEARCH MANUSCRIPTS
LOCATE EDITORS THAT WILL MOST LIKELY BE INTERESTED IN YOUR WORK.

HOT NEW MANUSCRIPTS
- ○ VIEW MY GENRES ONLY
- ○ VIEW MOST RECENT (ALL GENRES) [VIEW]

SEARCH BY KEYWORD AND GENRE — 190
ENTER KEYWORD: [            ]
                        192              194
SELECT GENRE: [CHOOSE A CATEGORY ⇕]   (SELECT SUB GENRES ▼)
SUB-GENRES:  ACTION AND ADVENTURE (x)
             LITERARY (x)
             RELIGOUS (x)
             ☐ SEARCH ONLY AVAILABLE MANUSCRIPTS
             (SEARCH)

- ☐ GENERAL/OTHER
- ☑ ACTION & ADVENTURE
- ☐ EROTICA
- ☐ FANTASY
- ☐ GAY/LESBIAN
- ☐ HISTORICAL FICTION
- ☐ HORROR
- ☐ HUMOROUS
- ☐ LITERARY
- ☑ MYSTERY/DETECTIVE/CRIME

- ☐ NON-ENGLISH FICTION      X UGLAS
- ☐ POETRY
- ☐ POLITICAL
- ☐ ROMANCE
- ☐ SCIENCE FICTION
- ☐ SHORT STORIES (SINGLE AUTHOR) & ANTHOLOGIES (MULTIPLE AUTHORS)
- ☐ SPORTS
- ☐ THRILLERS/SUSPENSE
- ☐ WAR & MILITARY/ESPIONAGE
- ☐ WESTERNS

BROWSE BY WRITER CREDENTIALS
- ☐ AWARDED AUTHORS
- ☐ PUBLISHED AUTHORS
- ☐ MEMBERS OF: (SELECT SUB GENRES ▼)
- ☐ SEARCH ONLY AVAILABLE MANUSCRIPTS (SEARCH)                                              82

HOME  TOUR  COMMUNITY  RESOURCES  NEWSLETTER

FIG. 13b

JOHN S. HUGHLEY                                    [ HELP | LOG OUT ]

MY MANUSCRIPTS    SEARCH MANUSCRIPTS    MY PREFERENCES    COMPANY ADMIN

SEARCH MANUSCRIPTS
LOCATE EDITORS THAT WILL MOST LIKELY BE INTERESTED IN YOUR WORK.

HOT NEW MANUSCRIPTS
○ VIEW MY GENRES ONLY
○ VIEW MOST RECENT (ALL GENRES)  VIEW

SEARCH BY KEYWORD AND GENRE
  ENTER KEYWORD: [                    ]
  SELECT GENRE: [ CHOOSE A CATEGORY  ▼]   ( SELECT SUB GENRES ▼ )
  SUB-GENRES: ACTION AND ADVENTURE (x)
              LITERARY (x)
              RELIGOUS (x)
              ☐ SEARCH ONLY AVAILABLE MANUSCRIPTS
              ( SEARCH )

| TITLE | AUTHOR |
|---|---|
| SPAGETTI EDDIE | ARTHUR T. GRANT |
| TOSS | ALEXANDER DOUGLAS |
| NEVER AGAIN | E.M. STEVENS |
| MY PARIS | MARIO DESALLE |
| NOT WITHOUT MY | HARVEY WILLIS |
| THE TRIMMINGS | R. KALAMBULA |
| SAGAN'S LINE | JAMES FRANKLIN |
| HOW TO STAR IN YO | NATHANIEL CARNEGIE |
| I SAVED LATIN | LAUREN ASIS LEE |
| MONSTER MANIAC | RICHARD STRAUSS |

VIEW MORE

—196

BROWSE BY WRITER CREDENTIALS

☐ AWARDED AUTHORS
        ☐ PUBLISHED AUTHORS                —198
        ☐ MEMBERS OF: ( SELECT SUB GENRES ▼ )
        ☐ SEARCH ONLY: ☐ AG-AUTHOR'S GUILD
                      ☑ ASJA-THE AMERICAN SOCIETY OF JOURNALISTS AND AUTHORS
                      ☐ NWU-NATIONAL WRITERS UNION
        ( SEARCH )    ☐ ROMANCE WRITERS OF AMERICA
                      ☐ SCBWI-SOCIETY OF CHILDREN'S BOOK WRITERS AND ILLUSTRATORS    82
                      ☐ SFWA-SOCIETY FICTION & FANTASY WRITERS OF AMERICA
                      ☐ WGA-WRITERS GUILD OF AMERICA x MY GENRE PREFERENCES

HOME  TOUR  COMMUNITY  RESOURCES  NEWSLETTER

*FIG. 14*

BOB VILA   YOU HAVE 3 NEW MANUSCRIPTS FOR REVIEW          HELP | LOG OUT

MY MANUSCRIPTS   SEARCH MANUSCRIPTS   MY PREFERENCES   COMPANY ADMIN

SEARCH RESULTS

<<PREVIOUS 1 2 3 4 5 6 7 8 9 10 NEXT>> RESULTS 1-20 OF 322 FOR HIGHWAY  SEARCH AGAIN [          ]  (SEARCH)

| TITLE —200 | AUTHOR —202 | GENRE —204 | DATE ADDED | AVAILABILITY | 210 |
|---|---|---|---|---|---|
| -LOST HIGHWAY: AMERICA'S SECRET SCENIC ROADWAYS | JOE MURPHY | NON-FICTION: TRAVEL | 01/24/2006 | PENDING FIRST REVIEW | ADD TO MY LIST |

SYNOPSIS WILL GO HERE. NAM LIBER TEMPOR CUM SOLUTA NOBIS ELEIFEND OPTION CONQUE NIHIL IMPERDIET DOMING ID QUOD MAZIM PLACERAT FACER POSSIM ASID ...MORE

| | | | | | |
|---|---|---|---|---|---|
| + SUNSET ON THE HIGHWAY | BOB KALAN | FICTION: LITERARY | 02/01/2006 | NOW WITH ANOTHER EDITOR | |
| + TERMINAL HIGHWAY | BETH ROMANOSKI | FICTION: HORROR | 02/01/2006 | AVAILABLE | ADD TO MY LIST |
| + THE WPA PROJECT SYNDROME | TOM CALLAHAN | NON-FICTION, NON-FICTION HISTORY | 05/17/2006 | AVAILABLE | ADD TO MY LIST |
| + BOOK TITLE GOES HERE | ROGER MARTIN | NON-FICTION | 05/01/2006 | AVAILABLE | ADD TO MY LIST |
| + BOOK TITLE GOES HERE | DANIEL WOODWARD | FICTION: HISTORICAL FICTION | 03/17/2006 | AVAILABLE | ADD TO MY LIST |
| + BOOK TITLE GOES HERE | JOE MURPHY | FICTION: WESTERNS | 01/24/2006 | AVAILABLE | ADD TO MY LIST |
| + BOOK TITLE GOES HERE | BOB KALAN | FICTION: SPORTS | 01/24/2006 | AVAILABLE | ADD TO MY LIST |
| + BOOK TITLE GOES HERE | BETH ROMANOSKI | GENERAL | 01/24/2006 | AVAILABLE | ADD TO MY LIST |
| + BOOK TITLE GOES HERE | TOM CHALLAHAN | GENERAL | 01/25/2006 | AVAILABLE | ADD TO MY LIST |
| + BOOK TITLE GOES HERE | ROGER MARTIN | GENERAL | 01/25/2006 | AVAILABLE | ADD TO MY LIST |
| + BOOK TITLE GOES HERE | DANIEL WOODWARD | NON-FICTION | 01/24/2006 | AVAILABLE | ADD TO MY LIST |
| + BOOK TITLE GOES HERE | JOE MURPHY | NON-FICTION | 01/24/2006 | AVAILABLE | ADD TO MY LIST |
| + BOOK TITLE GOES HERE | BOB KALAN | NON-FICTION | 01/24/2006 | NOW WITH ANOTHER EDITOR | ADD TO MY LIST |
| + BOOK TITLE GOES HERE | BETH ROMANOSKI | NON-FICTION | 01/24/2006 | AVAILABLE | ADD TO MY LIST |
| + BOOK TITLE GOES HERE | TOM CALLAHAN | NON-FICTION | 01/24/2006 | AVAILABLE | ADD TO MY LIST |
| + BOOK TITLE GOES HERE | ROGER MARTIN | NON-FICTION | 01/24/2006 | AVAILABLE | ADD TO MY LIST |
| + BOOK TITLE GOES HERE | DANIEL WOODWARD | NON-FICTION | 01/24/2006 | AVAILABLE | ADD TO MY LIST |
| + BOOK TITLE GOES HERE | JOE CAMPBELL | NON-FICTION | 01/24/2006 | AVAILABLE | ADD TO MY LIST |
| + BOOK TITLE GOES HERE | MARCY DARCY | NON-FICTION | 01/24/2006 | AVAILABLE | ADD TO MY LIST |

<<PREVIOUS 1 2 3 4 5 6 7 8 9 10 NEXT>>

HOME  TOUR  COMMUNITY  RESOURCES  NEWSLETTER

*FIG. 15*

JOHN S. HUGHLEY  [HELP] [LOG OUT]

   
MY MANUSCRIPTS  SEARCH MANUSCRIPTS  MY PREFERENCES  COMPANY ADMIN

MY PREFERENCES

PROFILE

PLEASE UPDATE YOUR INFORMATION AND CLICK THE "SAVE PROFILE" BUTTON AT THE BOTTOM OF THIS PAGE. FIELDS MARKED WITH AN ASTERISK(*) ARE REQUIRED.

MANAGE YOUR PREFERENCES
EDIT PROFILE
EDIT MANUSCRIPT PREFERENCES
EDIT STANDARD RESPONSES
CHANGE PASWORD

*FIRST NAME: [BOB] — 220
*MIDDLE INITIAL: [ ]
*LAST NAME: [VILA]
*TITLE: [EDITOR]
*COMPANY NAME: [PENGUIN BOOKS]
*STREET ADDRESS: [127 FALMOUTH AVE]
APT/SUITE/UNIT: [SUITE 227]
*CITY: [BOSTON]
*STATE: [AL ▼]
*ZIP/POSTAL/CODE: [123456]
*EMAIL ADDRESS: [B.VILLA2GMAIL.COM]
URL: [http://www.penguinbooks.com/]
BLOG: [http://www.vilanotes.com/]

80

— 222

NOTE TO WRITERS (MAXIMUM 500 CHARACTERS)

LOREM IPSUM DOLOR SIT AMET, CORSECTETUER ADIPISCIRG ELIT. MAECERAS NON ERAT. NAM FEUGIAT MASSA. SUSPERDISSE POTENTI. SED NIBH SAPIEN. BLARDIT QUIS. PELLENTESQUE GRAVIDA. LUCTUS SIT AMET EST. MAURIS VENENATIS. LIQULA VEL BIBERDUM BLANDIT, ICO NUNE ULTRICIES PEDE, ET IMPERDICT PUIRUS TORTOR SIT AMER MAGNA. SUSPERDISSE DOLOR. SUSPERDISSE POTENTI. NULLA DIGRISSM LAOREET CROS. SUSPERDISSE MAURIS. PHASOLIJE VELIT. QUISQUE TEMPUS. LOREM SIT AMET ELEMERTIUM BLARDIT, VELIT UMA EGESTAS TELLUS, QUIS RHORCUS RISI MASSA VITAE ML. MORBI CORSEQUAT DAPIBUS FELIS. SUSPERDISSE SEM METUS, AUCTOR UT, VIVERRA VEL, ARCU. PELLENTESCUE POSUERE.

ENTER THE ISBN NUMBERS FOR UP TO FIVE (5) PUBLISHED BOOKS YOU HAVE EDITED. — 224

123456789  123456789  123456789  123456789  123456789
+ ADD BOOK  + ADD BOOK  + ADD BOOK  + ADD BOOK  + ADD BOOK

    

CREATIVE MEDIA MARKETPLACE SYSTEM AND METHOD

BACKGROUND OF THE INVENTION

The present invention is directed to a creative marketplace system and a computer-based method for marketing creative media. The invention can be used to market media content in the book-publishing industry, the music industry, the scriptwriting industry, the jingle industry, and the like.

Arranging purchases, such as copyright assignment, licensing, or the like, between a potential seller, such as a writer, and a potential purchaser, such as an editor or publisher, can be frustrating for both parties. The potential seller has typically needed to submit his/her work to a single potential purchaser at a time and await a period of time before moving on to the next. Often the potential seller receives no information feedback from the potential purchaser other than an ultimate rejection letter.

The potential purchaser is also frustrated by the present system. Hundreds and even thousands of unsolicited submittals may be received and require review. Most of the time, individual submittals are of no interest to the potential purchaser. However, all must be reviewed to avoid missing the hidden gem. Often, the potential purchaser will be looking for a particular genre of work or will have certain requirements regarding the type of writer it is looking for. For example, an editor may only wish to work with writers that have already published or even those who have received awards for their work. However, little is available to assist the potential purchaser in organizing the myriad of submittals that are received.

SUMMARY OF THE INVENTION

The present invention is directed to a computer-based method and apparatus that facilitates arrangements between potential sellers of media content, such as song writers, authors, or the like, and potential buyers of media contents, such as editors, publishers, music arrangers, or the like. This is accomplished in an efficient manner that increases the likelihood of the interests of the potential buyer matching those of the potential seller.

A creative marketplace system and a computer-based method for marketing creative media, according to an aspect of the invention, include providing a computer system, the computer system defining a database. Inputs are received with said computer system from a plurality of potential sellers of media content and a plurality of potential purchasers of media content. Wherein, the inputs received from a potential seller include at least a portion of the media content and media content data. The media content data includes a characteristic of the media content and/or a characteristic of the potential seller of that media content. Wherein, the receiving inputs from a potential purchaser include receiving a selection of media content desired. The media content desired is selected from a characteristic of media content and/or a characteristic of the potential seller of that media content. Media content data is submitted that corresponds with media content desired by at least one potential buyer. The media content and media content data may be required to be submitted to a quality review process prior to submitting to at least one potential buyer.

These and other objects, advantages and features of this invention will become apparent upon review of the following specification in conjunction with the drawings.

BRIEF DESCRIPTION OF THE DRAWINGS

FIG. 5 is a view of a computer display used by a potential seller of media content for selecting genre information regarding particular media content;

FIG. 7 is a view of a computer display used by a potential seller of media content for searching based on characteristics of potential buyers of media content;

FIG. 8 is a view of a computer display used by a potential seller of media content for reviewing search results for potential buyers of media content;

FIG. 9 is a view of a computer display used by a potential seller of media content for reviewing a list of potential buyers of media content developed for that particular potential seller of media content;

FIG. 10 is a view of a computer display used by a potential seller of media content for establishing information regarding that potential seller of media content;

FIG. 11 is a view of a computer display used by a potential seller of media content for monitoring activity by a potential buyer of media content;

FIG. 12 is a view of a computer display used by a potential buyer of media content for tracking media content submitted to that potential buyer;

FIG. 13a is a view of a computer display used by a potential buyer of media content for setting preferences for targeted submissions of media content;

FIG. 13b is a view of a computer display used by a potential buyer of media content for establishing a set of criteria for use in searching a pool of media content;

FIG. 14 is the same view of a computer display as FIG. 13 illustrating establishing a different type of criteria for use in searching a pool of media content;

FIG. 15 is a view of a computer display used by a potential buyer of media content for viewing results of a search based on the criteria established by the display in FIG. 13 or FIG. 14;

FIG. 16 is a view of a computer display used by a potential buyer of media content for establishing a profile of that potential buyer of media content; and FIG. 17 is a view of a computer display used by a potential buyer of media content for establishing standard responses for use in communicating with potential sellers who have submitted media content to that potential buyer of media content.

DETAILED DESCRIPTION OF THE PREFERRED EMBODIMENT

Figure 1:
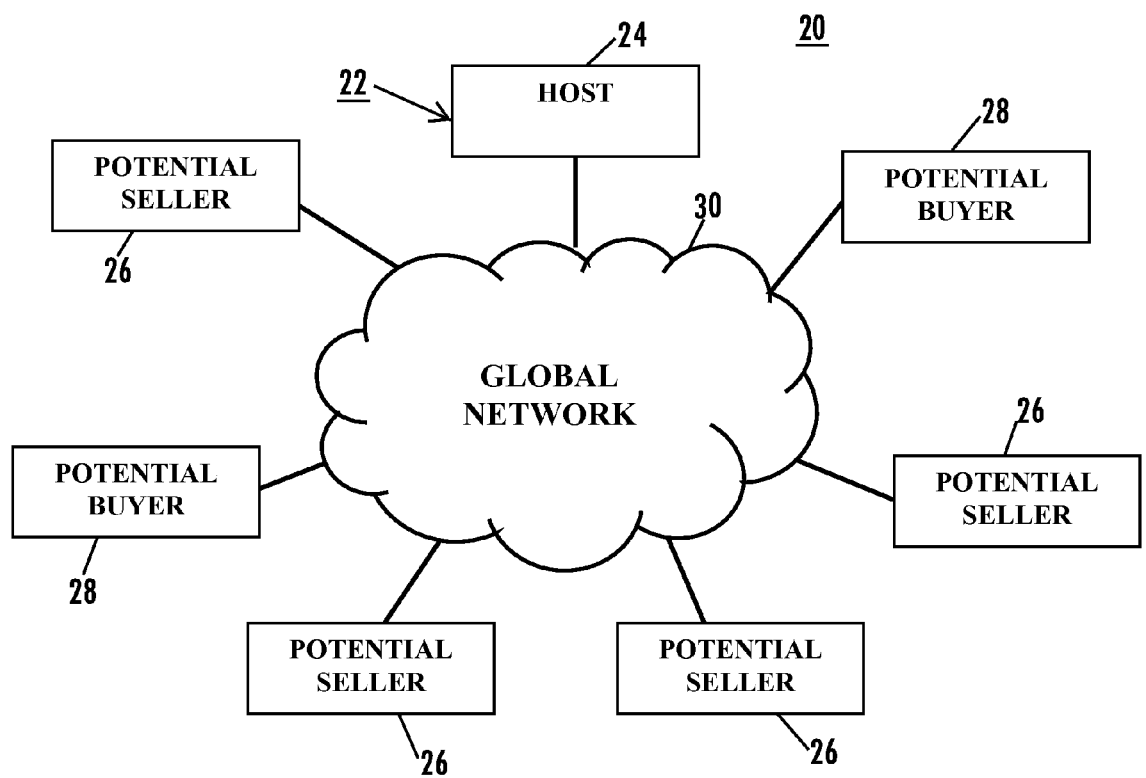
FIG. 1 is a block diagram of a creative marketplace system, according to the invention.

Referring now specifically to the drawings, and the illustrative embodiments depicted therein, a creative marketplace system 20 includes a computer system 22 made up of a host computer 24, a plurality of potential seller computers 26, and one or more potential buyer computers 28 (FIG. 1). Potential buyer computers 28, potential seller computers 26, and host computer 24 are interconnected, such as by a network 30.

Network 30 may be a global network, such as the Internet, but may, alternatively, be a wide area network, a local area network, or the like. Host computer 24 may be a hosted website on global network 30 or a separate computer or server. Potential buyer and potential seller computers may be personal computers, or the like.

Creative marketplace system 20 provides a computer-based system for marketing creative media. Creative media is any creative work that is embodied on a media of any form. The creative work may be a work of authorship in the copyright sense. However, it may encompass other works that are not subject to copyright protection. Examples of creative media include, but are not limited to, books; articles for newspapers, magazines or blogs; scripts; song scores; musical performances; jingles; cell phone ring tones; and the like. Therefore, it should be understood that, although the invention is illustrated in a creative marketplace system for manuscripts, the invention is not limited to manuscripts and is intended to encompass a wide range of works.

Figure 2:
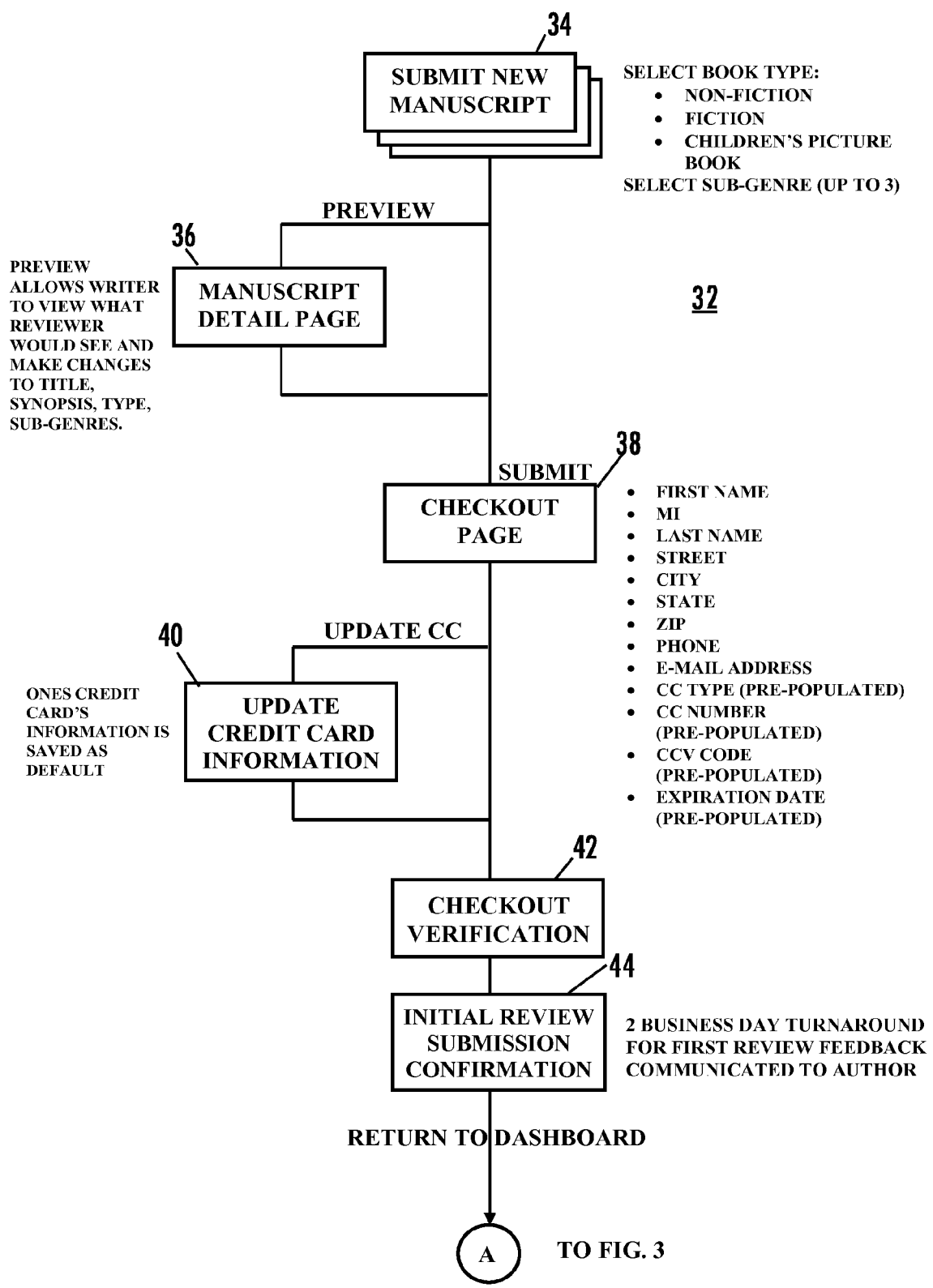
FIG. 2 is a flowchart of a process for a potential seller of media content to submit a work to quality review.

A creative marketplace system performs a computer-based method for marketing creative media. To this extent, host computer 24 is programmed with a process 32 for a potential seller of media content to submit a work to quality review (FIG. 2). Process 32 begins with a new creative media, such as a manuscript, which is ready to submit at 34. Process 32 includes a preview function 36 that allows the writer to preview what the reviewer, or first reader, would see when performing a quality control review. This allows the writer to make appropriate changes to the title, synopsis, type, sub-genres, and the like. When the creative media is ready for submission for quality review, a checkout page 38 allows the writer to submit identifying information, including credit card information. A function 40 is provided to allow the writer to update credit card information prior to check-out verification at 42 of the credit card. In the illustrative embodiment, the writer is charged a fee for submittal of a creative media to the quality review submission and for each submission to a potential buyer, such as an editor. Also, in the illustrative embodiment, the writer is provided a credit of the amount paid for quality review upon submittal of the creative media to the first editor. However, other payment schemes, such as auctioning media, content are possible. Process 32 then allows the creative media to be submitted for quality review at 44. Quality review provides two essential functions. First, it provides review feedback that is communicated to the writer. This allows the writer to produce a more saleable creative media. Second, it ensures to the potential buyer that media content data provided with respect to the creative media meets certain quality standards, and is accurate. For example, the quality review function may examine the genre, subgenre, and other information provided by the writer in order to ensure its correctness. Also, the quality review function may review information pertaining to the writer, such as whether the writer is published or has received awards, as represented by that writer. Also, an identity check of the writer may be made. The quality function may be performed by a person skilled in literary arts, also referred to as a "first reader". The function may, alternatively, be performed by a machine, such as by artificial intelligence, or the like.

Figure 3:
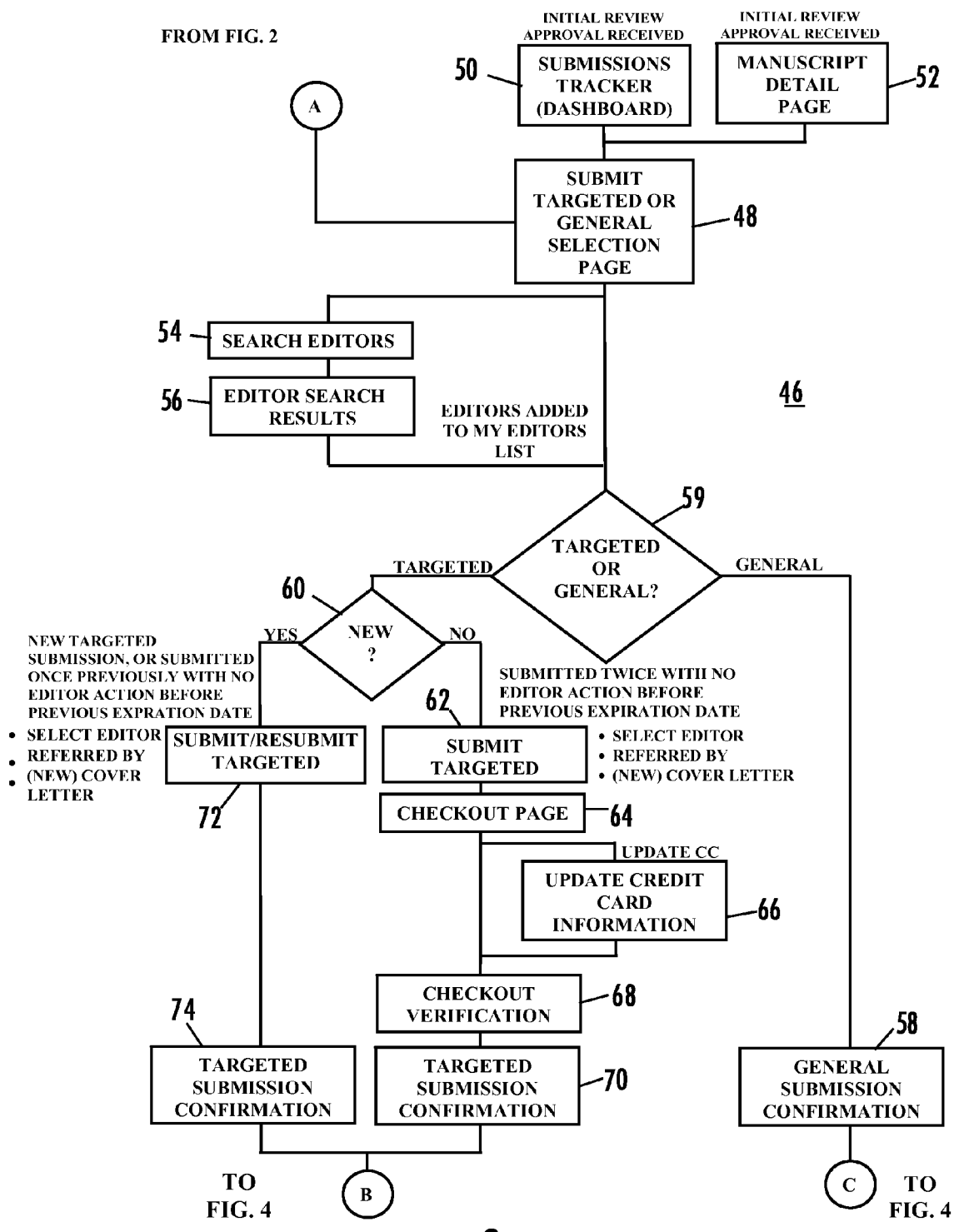
FIG. 3 is a flowchart of a process for a potential seller of media content to submit a work to a potential buyer.

Upon completion of quality review, the creative media is ready to be submitted to a potential buyer. A process for a potential seller of media content to submit a work to a potential buyer is illustrated at 46 (FIG. 3). The submission process begins by selection of whether the submission is to be to a targeted potential buyer, such as an editor, or a general submittal to a pool of non-targeted potential buyers. The targeted selection may be an exclusive selection, wherein the media content is submitted to a single-selected editor who then has a period of time, such as three weeks, to reject the creative media or to enter into negotiations for purchase of that media with the potential seller. Purchase can mean a full assignment of all rights, title, and interest in and to the creative media, a limited license to the media, or any other known form of transfer. For works that have already undergone quality review and having been submitted and rejected by an editor, a submissions tracker function 50 provides for resubmittal of the creative media to another editor or the general pool. The manuscript detail page 52 allows the writer to review at any time the details pertaining to the particular manuscript.

In order to assist the submittal of a manuscript to a targeted editor, process 46 includes a search editor's function 54 allows the writer to search for editors according to characteristics of the editor. For example, the writer may specify certain criteria of editors of interest, such as the genre type, the editor's publications, as well as subgenre, and the like. Process 46 includes a function at 56 for displaying the results of the search editor's function. It is then determined at 59 whether the writer designated (48) the submittal to be a general submission to the pool or a targeted submission. If a general submission is selected, the general submission is confirmed at 58 and the manuscript is submitted to the pool.

If it is determined at 59 that the writer selected a targeted selection at 48, it is determined at 60 whether the targeted selection was a first-time submittal or a resubmitted targeted submittal. If a first-time submittal, the targeted submittal at 62 goes to a check-out page at 64. The writer is provided with the opportunity to update credit card information at 66. Checkout verification occurs at 68, and the targeted submission is confirmed at 70. The targeted submittal at 62 allows the writer to select an editor and to generate a cover letter for review by that editor. A new targeted submission is determined at 60 as one that has never been previously submitted or has been submitted once previously with no editor action before the particular expiration date. For new submissions, the writer may be provided with a credit for the cost of the quality review process.

A resubmittal of a creative media is determined at 60 as one that has been submitted at least twice with no editor action before the prior expiration date. The resubmit occurs at 72, allows the writer to select a new editor and create a new cover letter. The writer may also indicate who referred the writer to that editor. The targeted submission is made and confirmed at 74.

Figure 4:
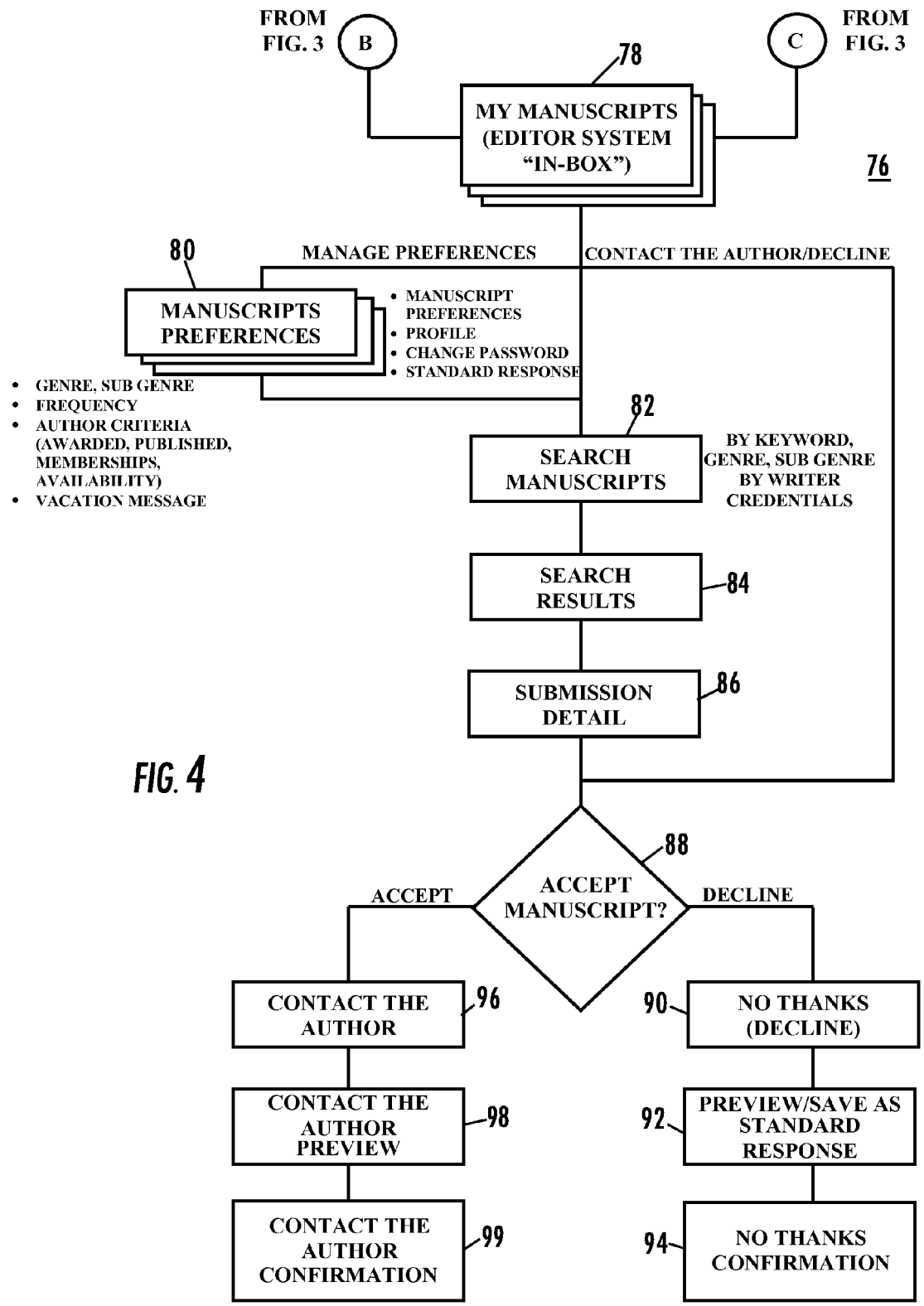
FIG. 4 is a flowchart of a process for a potential buyer of media content to identify media content of interest.

A process 76 for a potential buyer of media content to identify media content of interest is provided (FIG. 4). Process 76 begins by creative media, such as manuscripts, being in the editor's in-box at 78. A manuscript may find its way to an editor's in-box either from a targeted submission (70, 74) to that editor or by the editor performing a search of the general submissions in the pool of general submissions (58). One feature of process 76 is that it allows the function to push E-mails to potential buyers. The E-mails may be sent according to a schedule established by the potential buyer and according to characteristics of preferences set by that editor. For example, the potential buyer may wish to receive notification once a week that identifies the targeted transcripts that have been sent that week. This allows the editor both to be apprised of newly submitted articles that meet the criteria established by that editor and to avoid the necessity for the editor to remember to log on to the system to check for new submittals. The editor may receive manuscripts that are targeted to that editor or may receive manuscripts in his/her in-box by conducting a search of manuscripts in the general submission pool (58) by tools provided with system 20, as will be explained in more detail below. Process 76 allows the editor to establish manuscript preferences, or desires, at 80. The manuscript preferences may be, by way of example, according to genre, subgenre, whether the writer is published or has received any awards, and the memberships of the organizations to which the writer belongs. Other functions may be provided with process 80, such as establishing a vacation message, the frequency that E-mails are to be pushed to the editor, as well as to allow the editor to change passwords, create standard responses, and the like. Process 76 also may provide the editor a function to search manuscripts at 82 whether targeted or from the general pool and to display the search results at 84.

The editor is provided the tools to review submission details at 86. In the illustrative embodiment, the submission details the editor may be provided include the following information regarding a manuscript: name of writer, genre type, subgenre type, a synopsis and the first three chapters of a book. Other details could be provided as would be apparent to the skilled artisan. The editor may also print out the content of the submission. However, in the illustrative embodiment, the editor is not provided access to the entire manuscript. However, such full availability may be utilized according to the application of the invention.

Once the editor reviews a creative media, the editor ultimately determines whether to accept or decline the creative media. When it is determined at 88 that the editor declines the creative media, the editor may create a "no thanks" message at 90, which may be saved at 92 and subsequently reviewed for subsequent use and then may be sent at 94. If it is determined that the editor accepts the manuscript at 88, the editor is provided the tools to contact the writer at 96, such as by E-mail. The E-mail contact is managed through system 20 and avoids providing an identifying address of the sending editor. This prevents the writer from contacting the editor now or in the future. The editor is allowed to create a contact message at 98 and to confirm the sending of the contact message at 99. Once the editor is in contact with the writer, the editor can request a copy of the manuscript and enter into direct one-on-one negotiations with the writer for purchase of rights to the creative media. In the illustrative embodiment, it is envisioned that the editor, or publisher, will pay a licensing fee for access to system 20. While it is not contemplated that the system 20 will play any direct roll in the negotiations between the editor and the writer, variations in the system will be apparent to the skilled artisan.

Figure 6:
FIG. 6 is the same view of a computer display in FIG. 5 illustrating the selection of other information regarding the particular media content.

Illustration of manuscript detail page 36 is illustrated in FIG. 5. The writer is allowed to select a category, such as genre, subgenre, or the like, at 100 and may choose among selections at 102. There is also a field at 104 for entering the title of the work and a field at 106 for entering a synopsis. In the illustrated embodiment, the first three chapters of the work are entered at 108. FIG. 6 illustrates a different category selected at 100 and the choices that may be made available at 102.

Figure 8:
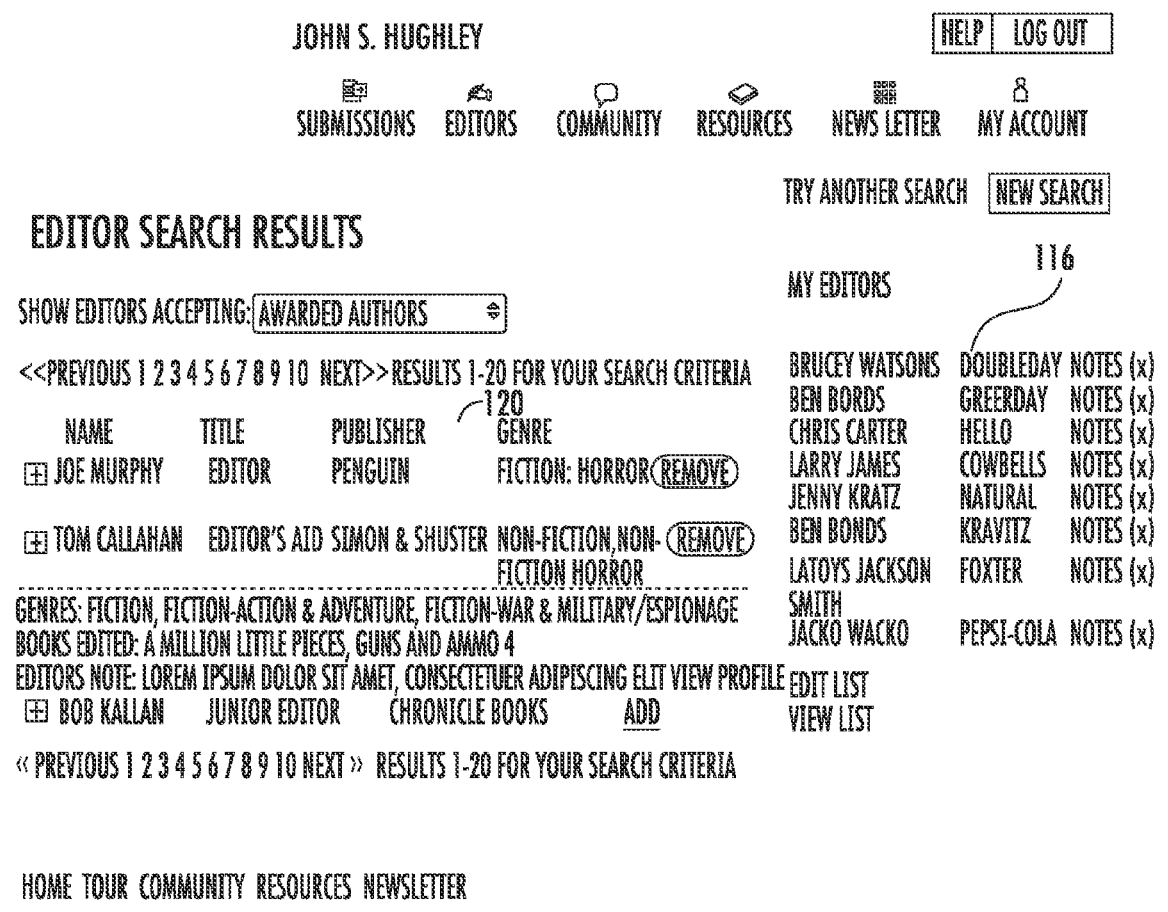

Details of the editor's search function 54 are illustrated in FIG. 7. An editor may be searched by name 110 or the publisher's name 112. The editor may be searched by genre at 114 and subgenre at 116. The genre and subgenre of the editor have previously been entered by the editor in an editor's profile, as will be discussed below. Function 54 provides an editor scratchpad 116 that allows the writer to identify editors of interest and to save those editors to scratchpad 116. Details of editor search results function 56 are illustrated in FIG. 8. A field 120 for listing the editors by name, title, publisher, genre, and the like, is provided at 120 and the editor's scratchpad is shown at 116. A detailed listing of the editor's scratchpad 116 is shown in FIG. 9. The editor's scratchpad allows the writer a selection at 130 for the editor to which the writer wishes to submit a creative media. Other more detailed information of the editor may be provided including the genre accepted and any notes made by the writer with respect to that editor. This also may provide a history of editors to whom creative media has already been submitted.

Details of the writer included with check-out page 38 are illustrated in FIG. 10. Fields are provided for identifying information of the writer at 140. A biography of the writer may be entered in a field 142, awards won by the writer may be provided in a field 144, and the organizations to which the writer belongs may be provided at 146.

Figure 11:
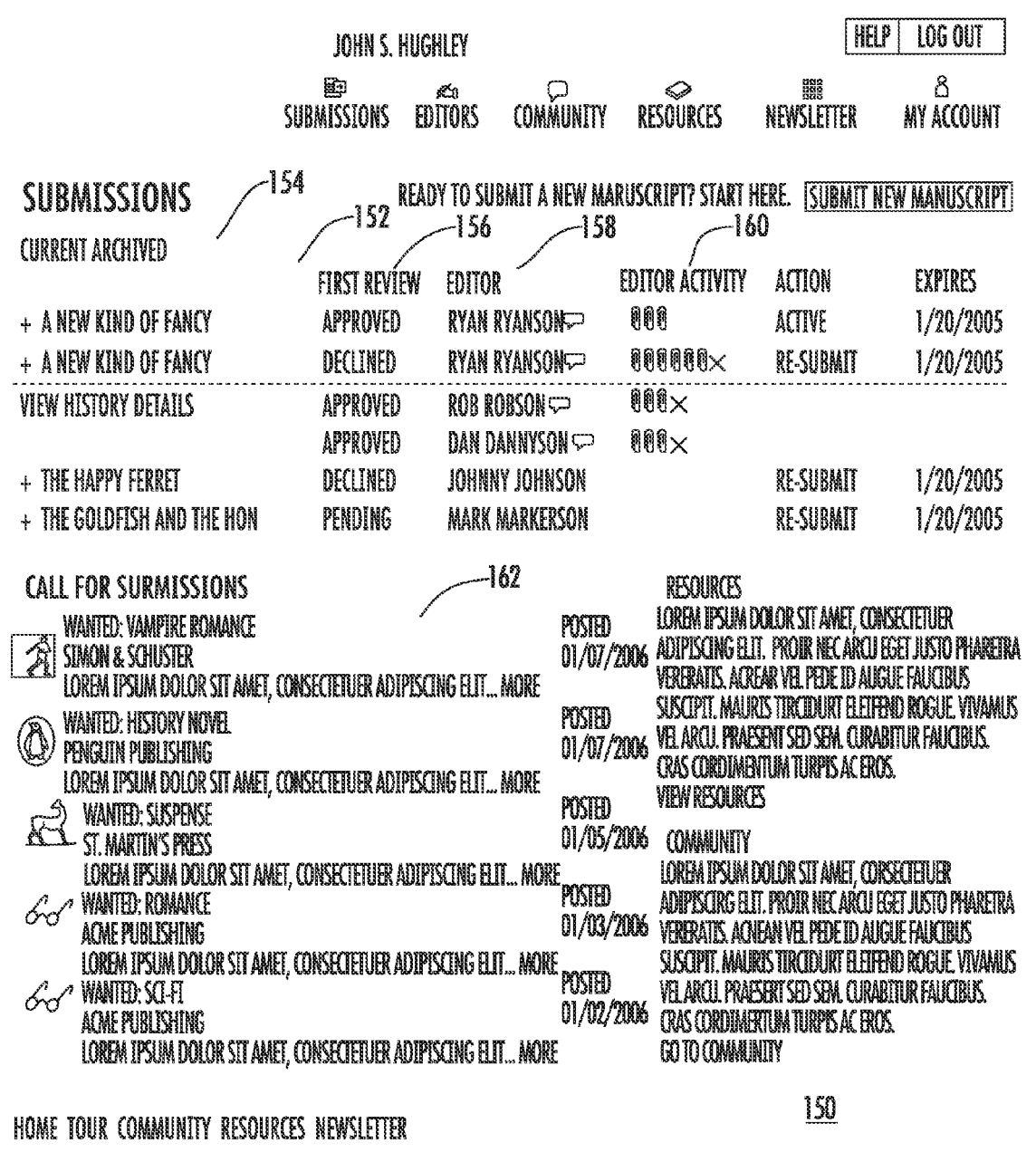

A submission tracker function 150 allows the writer to monitor activity of an editor to whom a transcript has been submitted (FIG. 11). A field 152 provides a column 154 for the work and a column 156 for the overall status of the review by the editor listed in field 158. An editor activity field 160 provides indications every time an editor has taken an action. The action may be to open the file of that particular creative media, print out the file, re-review the file, and the like. This provides feedback to the writer without burdening the editor. This is in contrast to known procedures in which the writer is kept in the dark until receiving an approval or decline by the editor. Also, a field 162 may be provided for requests by particular editors for genre, or the like.

FIG. 12 illustrates details of the editor in-box function 78. A field 170 provides a list of the creative media submitted by date, as well as columns, title, 172, writer, 174, genre, 176, and fields 178 for action that has been taken by that editor. Also, an expiration date, column 180, allows the editor to be apprised of when his/her exclusive period is to expire. Also, a software button 182 allows the editor to contact the writer. This will set up a series of fields for entry of communications to the writer.

The manuscript preference function 80 is illustrated in FIG. 13a. Manuscript preference function 80 provides a field 184 that allows the editor to specify which one or more genre the editor wishes to accept. A similar sub-genre select function 185 is provided. The editor may select at 186 an interval for receiving notification, such as by E-mail, facsimile, or the like, of newly submitted manuscripts meeting the requirements specified at 184, 185. Also, fields are provided at 188 to allow the editor to select requirements for the writer, per se. Such writer information may include whether the writer is published, has received awards, is a member of certain associations, been referred by another writer, or the like. Also, the editor may be provided tools to create messages, such as vacation messages, or the like.

The search manuscript function 82 is illustrated in FIG. 13b. Search manuscript function 82 provides a field at 190 for the editor to enter keywords as well as a field 192 that allows the editor to select among various choices according to category. Examples of choices are shown at 194, which open up upon selection of a particular category at 192. FIG. 14 shows that function 92 additionally includes selections at 196 for searching according to writer credentials, including pop-up menus, such as writer's organizations at 198. However, other selections would be apparent to the skilled artisan.

Figure 17:
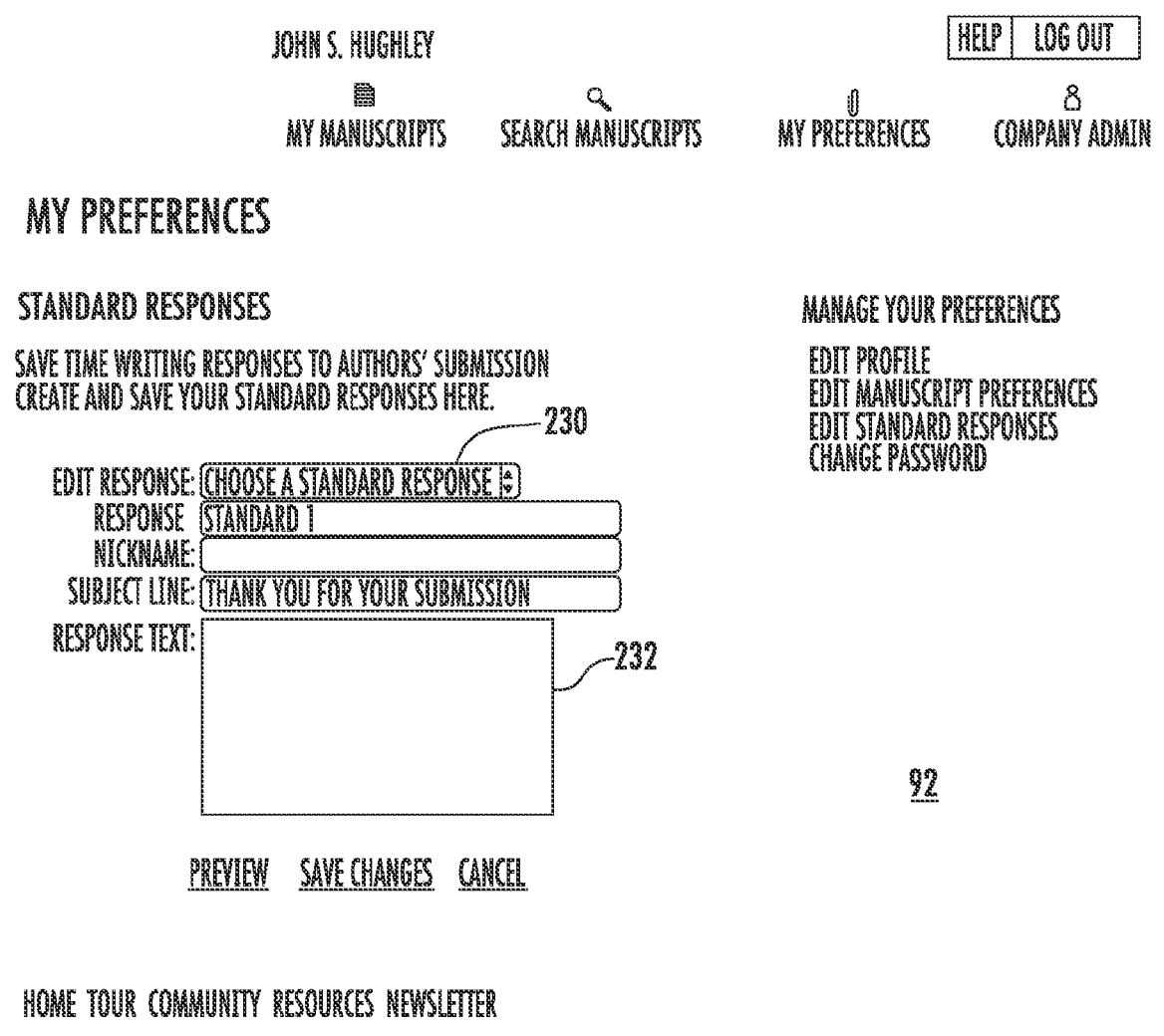

Details of the search results display function 84 are illustrated in FIG. 15. The search results may be displayed, by way of example, according to title, 200, writer, 202, genre, 204, date added, 206, availability, 208, and the ability to add the creative media to the editor's in-box at 210. Details of the manuscript preference function 80 are illustrated in FIG. 16. These include identifying fields 220, as well as a field 222 to allow the editor to prepare a message to potential writers. Also, a field 224 may be provided for the editor to illustrate books that it has published in the past. FIG. 17 illustrates details of function 92 that allow an editor to prepare standard responses to writers. This function allows the editor to choose at 230 what type of response it wishes to create and to create the response at 232.

Thus, it is seen that the present invention allows the optimal choices to both potential sellers and potential buyers of media in order to make the process more efficient and thereby more effective. For example, established sellers of creative media may create a narrowly focused submittal of media to a limited number of potential buyers who the seller knows would most likely be of interest. However, a new potential seller of media may select a wide range of potential sellers for review of his/her creative media. This may be accomplished by a broad listing of selection criteria of potential buyers.

Likewise, a potential buyer of creative media may choose to receive either a wide selection of potential media or a very narrow focused selection of creative media. This allows the potential seller to view as many or as few creative media as desired. This is accomplished by the designation of criteria by the editor the types of creative media it wishes to review.

Also, the quality review process ensures that potential buyers are exposed only to reliable submissions by potential sellers. Also, communication between the potential buyers and potential sellers is enhanced by allowing the potential sellers to observe the activity of the potential buyer while not being able to directly contact the potential buyer. The potential buyer is able to communicate anonymously with the potential seller, such as to ask for review of additional material pertaining to the creative media, to enter into negotiations, or the like.

Changes and modifications in the specifically described embodiments can be carried out without departing from the principles of the invention. For example, rather than having the option of either submitting creative media exclusively to one potential buyer at a time or submitting the creative media to a general pool, the potential seller may be provided an auction option. The auction option would allow the potential seller to submit the creative media to multiple potential buyers who would then have a fixed time period in which to bid on the work. The invention is intended to be limited only by the scope of the appended claims, as interpreted according to the principles of patent law including the doctrine of equivalents.

What is claimed is:

1. A computer-based method for marketing creative media, said method comprising:
   providing a computer system, said computer system defining a database;
   receiving inputs with said computer system from a plurality of potential sellers of creative media content and at least one potential purchaser of rights related to creative media content;
   wherein the receiving inputs from a potential seller include receiving at least a portion of the creative media content and media content data, said media content data comprising at least one chosen from i) a characteristic of the creative media content and ii) a characteristic of the author of that media content;
   said receiving inputs from at least one potential purchaser of rights related to creative media including receiving a selection of creative media content desired, said creative media content desired comprising at least one chosen from i) a characteristic of the media content and ii) a characteristic of the potential seller of that creative media content;
   providing at least two modes for said computer system that are selectable by the potential seller of rights related to creative media for submittal of creative media content, said at least two modes comprising a first mode for targeted submittal to a particular potential purchaser of rights related to creative media who is selected by the potential seller of rights related to creative media and a second mode for general submittal to a pool of a plurality of potential purchasers of rights related to creative media;
   submitting creative media content and creative media content data with said computer system to at least one potential purchaser of rights related to creative media that corresponds with creative media content selected by that at least one potential purchaser of rights related to creative media and in accordance with the one of the first and second modes selected by the potential seller of rights; and
   providing a communication function with said computer system, said communication function allowing the at least one potential purchaser of rights related to creative media to directly communicate with a potential seller of rights related to creative media an intention to enter into negotiations with that potential seller of rights related to creative media.

2. The method of claim 1 wherein said computer system comprises a global network.

3. The method of claim 2 wherein said global network comprises a worldwide web and wherein said database comprises a webpage on said worldwide web.

4. The method of claim 1 wherein said at least a portion of creative media content includes less than all of the creative media content.

5. The method of claim 1 including informing the potential seller of rights related to creative media of activities of a potential purchaser of rights related to creative media with respect to reviewing the creative media content and media content data submitted by that potential seller of rights related to creative media to that potential purchaser of rights related to creative media.

6. The method of claim 5 wherein said activities comprise at least one chosen from i) accessing the media content data and ii) printing the media content data.

7. The method of claim 1 wherein said providing direct communication includes masking any communication address of the potential purchaser of rights related to creative media.

8. The method of claim 1 including communicating media content data pertaining to media content desired by a potential purchaser of rights related to creative media at a regular interval to that potential purchaser of rights related to creative media.

9. The method of claim 1 including receiving information regarding potential purchasers of rights related to creative media and providing the information regarding potential purchasers of rights related to creative media to the potential sellers of rights related to creative media.

10. A creative media marketplace system, said system comprising:
   a computer system, said computer system defining a database; said computer system programmed to receive inputs from a plurality of potential sellers of rights related to creative media content and at least one potential purchaser of rights related to creative media content;
   wherein the inputs received from a potential seller of rights related to creative media include an input to receive at least a portion of media content and media content data, the media content data comprising at least one chosen from i) a characteristic of media content and ii) a characteristic of an author of that media content;

wherein the inputs received from the at least one potential purchaser of rights related to creative media include an input for a selection of characteristics of creative media content desired, the media content desired comprising at least one chosen from i) a characteristic of creative media content and ii) a characteristic of an author of that creative media content;

wherein said computer system includes at least two modes that are selectable by the potential seller of rights related to creative media for submittal of creative media content, said at least two modes comprising a first mode for targeted submittal to a particular potential purchaser of rights related to creative media who is selected by the potential seller of rights related to creative media and a second mode for general submittal to a pool of a plurality of potential purchasers of rights related to creative media;

wherein said computer system is further programmed to submit only creative media content data to at least one potential purchaser of rights related to creative media that have characteristics of creative media content that corresponds with creative media content entered by that at least one potential purchaser of rights related to creative media and in accordance with the one of the first and second modes selected by the potential seller of rights; and said computer system further including a communication function, said communication function allowing the at least one potential purchaser of rights related to creative media to directly communicate with a potential seller of rights related to creative media an intention to enter into negotiations with that potential seller of rights related to creative media.

11. The marketplace system of claim 10 wherein said computer system comprises a global network.

12. The marketplace system of claim 11 wherein said global network comprises a worldwide web and wherein said database comprises a webpage on said worldwide web.

13. The marketplace system of claim 10 wherein said at least a portion of media content includes less than all of the media content.

14. The marketplace system of claim 10 wherein said computer system is programmed to inform the potential seller of the rights related to creative media of activities of the at least one potential purchaser rights related to creative media pertaining to review of the media content and media content data submitted by that potential seller of rights related to creative media to that potential purchaser of rights related to creative media.

15. The marketplace system of claim 14 wherein said activities comprise at least one chosen from i) accessing the media content data and ii) printing the media content data.

16. The marketplace system of claim 10 wherein said communication function masks any communication address of the potential purchaser of rights related to creative media.

17. The marketplace system of claim 10 wherein said computer system is programmed to communicate media content data pertaining to media content desired by a potential purchaser at a regular interval to that potential purchaser.

18. The marketplace system of claim 10 wherein said computer system is programmed to receive information regarding the at least one potential purchasers of rights related to creative media and to provide the information regarding the at least one potential purchasers of rights related to creative media to the potential sellers of rights related to creative media.

* * * * *